(12) United States Patent
Oh et al.

(10) Patent No.: US 6,957,089 B2
(45) Date of Patent: Oct. 18, 2005

(54) COMPACT HANDS-FREE ADAPTER FOR USE WITH A CELLULAR TELEPHONE

(75) Inventors: Sang Hoon Oh, East Hills, NY (US); James Bak, Bayside, NY (US); Yiu-Ming Lai, Kowloon (HK)

(73) Assignee: Coby Electronics Corporation, Maspeth, NY (US)

( * ) Notice: Subject to any disclaimer, the term of this patent is extended or adjusted under 35 U.S.C. 154(b) by 361 days.

(21) Appl. No.: 09/871,570

(22) Filed: May 31, 2001

(65) Prior Publication Data

US 2002/0183101 A1 Dec. 5, 2002

(51) Int. Cl.[7] .............................. H04B 1/38; H04M 1/00
(52) U.S. Cl. ................ 455/569.1; 455/570; 455/575.1; 455/90.3; 455/575.6; 379/428.01; 379/420.01; 379/420.02; 379/433.02; 379/433.03; 379/433.05
(58) Field of Search ............................ 455/569.1, 570, 455/575.1, 90.3, 575.6, 569, 575, 90; 379/433.02, 433.03, 433.05, 420.01, 420.02, 420.03, 428.01

(56) References Cited

U.S. PATENT DOCUMENTS

| | | | | |
|---|---|---|---|---|
| 4,741,018 A | * | 4/1988 | Potratz et al. ............... | 455/569 |
| 5,550,901 A | * | 8/1996 | Williams ................. | 379/93.05 |
| 5,588,041 A | | 12/1996 | Meyer, Jr. et al. | |
| 5,590,417 A | * | 12/1996 | Rydbeck ..................... | 455/568 |
| 5,646,990 A | * | 7/1997 | Li ......................... | 379/406.08 |
| 5,696,819 A | | 12/1997 | Siuzu et al. | |
| 5,790,652 A | * | 8/1998 | Gulley et al. ................ | 379/368 |
| 5,896,461 A | * | 4/1999 | Faraci et al. ................. | 381/386 |
| 5,970,418 A | * | 10/1999 | Budd et al. .................. | 455/550 |
| 5,991,646 A | | 11/1999 | Frank et al. | |
| 6,002,945 A | * | 12/1999 | McDuffee ................ | 455/556.1 |
| 6,018,670 A | | 1/2000 | Degenhardt | |
| 6,081,594 A | | 6/2000 | Tseng | |
| 6,094,582 A | | 7/2000 | Zimmermann | |
| 6,097,971 A | | 8/2000 | Hosoi | |
| 6,122,531 A | * | 9/2000 | Nicholls et al. ............ | 455/570 |
| 6,138,040 A | * | 10/2000 | Nicholls et al. ............ | 455/569 |
| 6,185,299 B1 | * | 2/2001 | Goldin .................. | 379/406.08 |
| 6,266,410 B1 | * | 7/2001 | Takahashi et al. ...... | 379/420.02 |
| 6,636,750 B1 | * | 10/2003 | Zurek et al. ............. | 455/569.1 |
| 6,766,175 B2 | * | 7/2004 | Uchiyama ................... | 455/462 |

FOREIGN PATENT DOCUMENTS

| | | |
|---|---|---|
| WO | WO 00/17014 | 3/2000 |
| WO | WO 00/60830 | 10/2000 |

OTHER PUBLICATIONS

International Search Report dated Dec. 5, 2002.

* cited by examiner

*Primary Examiner*—Marceau Milord
(74) *Attorney, Agent, or Firm*—Brown Raysman Millstein Felder & Steiner LLP

(57) ABSTRACT

The present invention provides a portable, pocket sized speakerphone device adaptable for use with a cellular telephone, and a method for making such a device. The device reduces howling, including echoing and feedback, sufficiently to enable use of the device as a telephone speakerphone. To reduce howling, one or more of the following may be utilized: attenuation circuitry; sound insulation means; positioning the loudspeaker and the microphone of the device such that the outlet of the loudspeaker for emitting sound from the loudspeaker faces in the same direction as the outlet of the microphone for receiving sound into the microphone, and such that a line extending between the outlet of the loudspeaker and the outlet of the microphone would form a right angle with a line extending in the direction of the outlet of the loudspeaker and the outlet of the microphone face.

35 Claims, 6 Drawing Sheets

COMPACT HANDS-FREE ADAPTER FOR USE WITH A CELLULAR TELEPHONE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to hands-free adapters for cellular telephones, and in particular to a hands-free adapter which is compact in size and which has adequate loudspeaker and microphone capacities but which reduces the negative effects of howling or feedback.

Cellular telephone usage has risen dramatically over recent years and will probably continue to rise in the future. Widespread availability and affordability of cellular telephones is affecting the way people conduct business and communicate socially. Cellular telephones are so useful they have become practically a necessity to many professionals and highly desirable for social use in a wide variety of circumstances. People now use cellular telephones while driving in their cars, walking down the street, relaxing outdoors, etc.

In spite of the great utility and convenience of cellular telephones, their manner of use presents some difficulties, inconveniences, and even dangers. Typical use of a cellular telephone generally requires that the user hold the cellular telephone against the side of the user's head, so that microphone is extremely close to the user's mouth, and so that the speaker is extremely close to the user's ear. This generally requires the constant use of at least one of the user's hands, which is often inconvenient and can be dangerous, for example, when driving a car. Further, many people find it uncomfortable and annoying to have a cellular telephone up against their face during conversation. In addition, there is concern that the proximity of the cellular telephone to the user's head may present health dangers from exposure to microwave radiation.

The increasing amount of time that a typical user spends using a cellular telephone and the increasing variety of circumstances in which cellular telephones are used have made practical and convenient hands free cellular telephone usage greatly desirable. One approach to handling this problem has been to provide hands free headset devices worn on the user's head, including a set of earphones and a microphone situated close to the users mouth, which devices connect to the user's cellular telephone. There are a number of problems with the hands free head set device approach, however. Headsets can be uncomfortable, unattractive, cumbersome and annoying to wear. In addition, the user must remove the headset to perform various activities such as to eat, or to engage in normal physical interaction with other people.

Another approach to the problem has been aimed at providing speakerphone devices. Typical speakerphone devices can be useful in the context of wired telephones and cordless telephones, when a large speakerphone can be left in one place and used by a user who remains in the area near the speakerphone device. Of course, such large speakerphone devices are not conveniently portable, so their use with cellular telephones would to a large extent defeat an important purpose of the cellular telephone in serving as a portable communications device.

For these reasons, much effort of late has been directed to providing a conveniently portable speakerphone device adaptable for use with a cellular telephone. One approach, for users of cellular telephones in cars, has been to provide devices that connect with a cellular telephone to allow loudspeaker broadcast of incoming voice sound, such as though the speakers of the car's stereo system, and to provide a hands free microphone that extends near the driver's mouth.

A greatly desirable solution, however, for a wide variety of circumstances of cellular telephone usage, would be to provide a small, light, conveniently portable device that a user could connect to the user's cellular telephone to provide convenient hands free speakerphone operation. Such a solution would allow a user to simultaneously enjoy the benefits of the portable communications capability of a cellular telephone as well as the more natural, convenient and safe method of communication of a speakerphone device.

In spite of the desirability of such a solution, however, implementation has proved difficult to achieve. One problem is that speakerphone devices have an inherent difficulty in that the loudspeaker broadcast of incoming voice sound tends to be picked up by the microphone which is intended to pick up the voice of the person physically near the speakerphone. The microphone can pick up these broadcast signals not only outside the device but also inside the device, especially if the device is compact. This causes sound problems, such as echoing and feedback type problems, for users of speakerphone devices, which problems are sometimes referred to as "howling". The howling problem becomes more severe when the microphone is situated very close to the speaker, such as would need to be the case in a small, portable speakerphone device. This applies particularly for internal howling.

One way to reduce howling includes reducing the sensitivity of the microphone or volume of the speaker. However, it then becomes more difficult for the user or the individual with whom the user is speaking to hear and understand each other. To mitigate less severe howling problems that occur with large speakerphone devices, circuitry known as attenuation circuitry has been used, which may vary the level of amplification of the signal provided to the microphone or the output power of the loudspeaker, to reduce howling. However, attenuation circuitry has no or little effect on internal howling.

Thus, despite the availability of the above methods of mitigating howling in speakerphone devices, attempts to design a speakerphone device small enough to be conveniently portable and in which howling is satisfactorily mitigated have in the past proved unsuccessful.

A conveniently compact and portable speakerphone device adaptable for use with a cellular telephone would enable the user to enjoy hands and headset free operation of the user's cellular telephone practically anywhere and during all kinds of activities, from driving in a car to sitting on bench to lying on a blanket.

Therefore, there is a need in the art for a portable hands-free or speakerphone device adaptable for use with a cellular telephone.

SUMMARY OF THE INVENTION

It is an object of the invention to provide a compact speakerphone device adaptable for use with a cellular telephone, which device avoids the problem of howling sufficiently to enable use of the device as a telephone speakerphone.

It is another object of the invention to provide a compact speakerphone device adaptable for use with a cellular telephone, which device avoids the problem of howling sufficiently to enable use of the device as a telephone speakerphone such that the user can speak in a normal conversational volume and be understood by the person with whom the user is conversing via the device and such that the person with whom the user is conversing via the device can speak in a normal conversational volume and be understood by the user.

In one embodiment, the invention provides a compact, approximately pocket sized speakerphone device adaptable for use with a cellular telephone, which device avoids the problem of howling sufficiently to enable use of the device as a telephone speakerphone. Preferably, the device avoids the problem of howling sufficiently to enable use of the device as a telephone speakerphone such that the user can speak in a normal conversational volume and be understood by the person with whom the user is conversing via the device and such that the person with whom the user is conversing via the device can speak in a normal conversational volume and be understood by the user.

In another embodiment, the invention provides a compact, approximately pocket sized speakerphone device adaptable for use with a cellular telephone, the device having attenuation circuitry and having sound insulation positioned within the device's housing between the loudspeaker and the microphone of the device, which attenuation circuitry and sound insulation reduce howling sufficiently to enable use of the device as a telephone speakerphone.

In another embodiment, the invention provides a compact, approximately pocket sized speakerphone device adaptable for use with a cellular telephone, the device having attenuation circuitry and having sound insulation positioned within the device's housing between the loudspeaker of the device and the microphone of the device, and in which an outlet of the loudspeaker for emitting sound from the loudspeaker faces in the same direction as an outlet in the microphone for receiving sound into the microphone.

In another embodiment, the invention provides a pocket sized speakerphone device adaptable for use with a cellular telephone, which device is usable as a telephone speakerphone, and which device has sound insulation material disposed around the microphone to reduce howling.

In another embodiment, the invention provides a pocket sized speakerphone device adaptable for use with a cellular telephone, which device is usable as a telephone speakerphone, and wherein an outlet of the loudspeaker of the device for emitting sound from the loudspeaker faces in the same direction as an outlet of the microphone of the device for receiving sound into the microphone, and wherein a line extending between the outlet of the loudspeaker and the outlet of the microphone would form a right angle with a line extending in the direction that the outlet of the loudspeaker and the outlet of the microphone face.

In another embodiment, the invention provides a method for making a pocket sized speakerphone device adaptable for use with a cellular telephone, which method includes means for reducing howling sufficiently to enable use of the device as a telephone speakerphone. The method includes providing attenuation circuitry and providing sound insulation positioned within the device's housing between the loudspeaker of the device and the microphone of the device, in which the attenuation circuitry and the sound insulation reduce howling sufficiently to enable use of the device as a telephone speakerphone. In one embodiment, the method further includes positioning an outlet of the loudspeaker for emitting sound from the loudspeaker to face in the same direction as an outlet of the microphone for receiving sound into the microphone.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
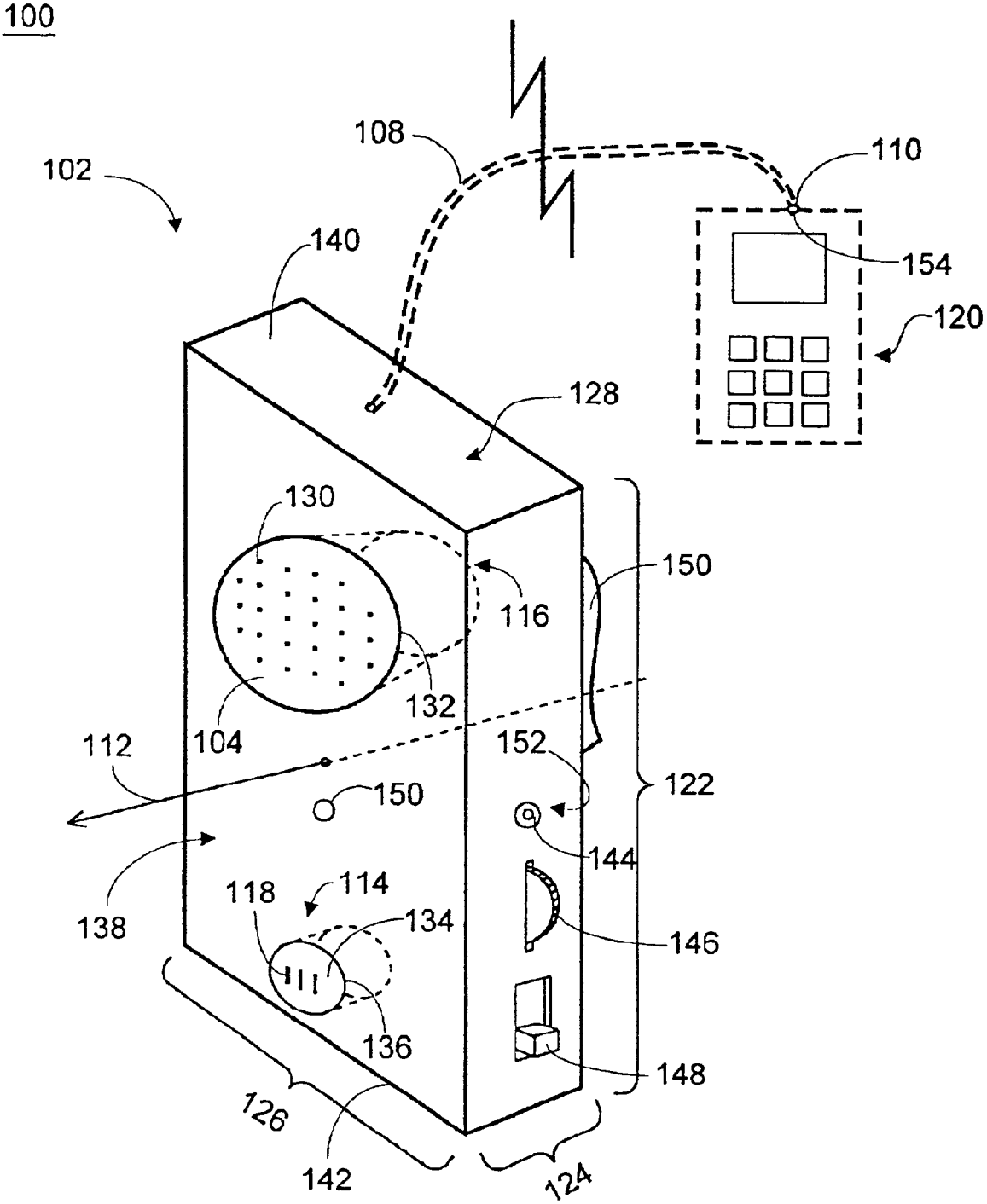
FIG. 1 is a perspective view of the hands-free adapter device according to one embodiment of the present invention.

In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

The present invention generally provides a portable, compact hands-free adapter device that is adaptable for use with a cellular telephone, and that avoids the problems of internal and external howling sufficiently to enable use of the device as a telephone speakerphone. In one embodiment, the invention provides a pocket sized device adaptable for use with a cellular telephone. The term "telephone speakerphone" as used herein refers to any device that allows a user of the device to communicate via the device telephonically with a remote person, in which a microphone of the device picks up words spoken by the user positioned at a short distance from the device, e.g., several feet, to be transmitted telephonically and understood by the remote person, and in which a loudspeaker of the device broadcasts telephonically transmitted words spoken by the remote person to be understood by the user positioned at the short distance from the device. For instance, many non-cellular telephone devices allow speakerphone operation at the touch of a button on the non-cellular telephone device.

The term "pocket sized" as used herein to describe the size of the adapter refers to a size that is compact and allows the adapter to readily fit into and be removed from a clothing pocket about the size of a front pocket in a pair of pants. The term is used herein for convenience to generally describe the size of the hands-free adapter of embodiments of the present invention even though the adapter is not typically intended for use within a pocket (but may be carried therein) but rather is intended for use in an open space. In general, the adapter is compact in size in that it is as small as practical to house the necessary electrical components to receive and transmit sound and be self-powered. A typical use of the adapter is in an automobile while driving, and the adapter would be positioned in a secure and open location within the car, e.g., on the dashboard or the visor. The adapter is comparable in size to other compact devices designed for use or storage in cars such as radar detectors, garage door openers, glass cases, etc. Another typical use of the adapter is clipped onto a belt or other item of clothing, and the adapter is comparable in size to other compact devices used in similar fashion such as portable radios, beepers, etc.

The term "cellular telephone" as used herein refers broadly to any device or combination of devices that itself or in combination with a speakerphone device enables cellular telephonic communication, whether or not the cellular telephone has a loudspeaker or a microphone.

The term "howling" as used herein generally includes feedback resulting from sounds emitted from a telephone speakerphone which reduce the clarity, accuracy, and/or understandability of the replication of the sound by the loudspeaker of the voice of the person with whom a user of the telephone speakerphone is conversing via the telephone speakerphone, and also includes sounds received into the microphone of a telephone speakerphone that reduce the clarity, accuracy, and/or understandability of the sound of the voice of the user of the telephone speakerphone as reproduced to be heard by the person with whom the user of the telephone speakerphone is conversing via the telephone speakerphone. One possible cause of howling is the picking up or sensing by a microphone of sound emitted externally by a loudspeaker. As recognized herein, another possible cause for howling is the pickup or sensing of sound waves emitted from the internal components of the loudspeaker as transmitted within a housing to the back of a microphone.

FIG. 1 shows a perspective view 100 of one embodiment of the hands-free adapter speakerphone device 102 of the present invention. As shown in FIG. 1, the speakerphone device 102 is block shaped, but various other shapes are possible, including shapes in which any one or more sides are not planar but rather contain curvature, indentations, or similar directional variations as desired, for example, for aesthetic effect. The exterior of the speakerphone device 102 is defined by a housing 128, and the speakerphone device 102 has a length 122, width 126, and thickness 124 defined by the housing 128. The speakerphone device 102 shown is about 4.3 inches in length, about 2.2 inches in width, and about 0.7 inches in thickness. The housing may be made of various materials, including plastic or metal. The housing 128 contains a loudspeaker 116 and a microphone 114, each positioned toward opposite ends 140, 142 of the length 122 of the housing 128. In the embodiment shown, a distance of approximately 78 millimeters separates the microphone 114 from the loudspeaker 116. The loudspeaker 116 as shown is 50 millimeters in diameter. A rotary volume control 146 to allow the user to control the volume of the loudspeaker 116 is provided. The microphone 114 as shown is a high sensitivity omni-directional condenser microphone. A high/low sensitivity control 148 to allow the user to control the sensitivity of the microphone 114 is provided. Further, a 4.5 volt DC power jack 144 allows connection, if desired, of the speakerphone device 102 to an external power source, for instance via a wall socket. As shown, a clip 150 is fixed to a back 152 of the housing 128 to allow the speakerphone device to be clipped, for example, to the visor of a car or to a belt.

The microphone 114 is typically for picking up or sensing the spoken words of the user of the speakerphone device 102 to be transmitted to and reproduced to be listened to and understood by a person or persons with whom the speaker is conversing via the speakerphone device 102, and the loudspeaker 116 is typically for broadcasting sound reproducing the sound of the spoken words of the person or persons with whom the user of the speakerphone device 102 is conversing via the speakerphone device 102, to be heard and understood by the user of the speakerphone device 102.

In the embodiment shown, the housing 128 has a surface area 104 which is part of the front surface 138 of the housing 128, the surface area 104 having a plurality of apertures 130, and the surface area 104 being over an outlet 132 of the loudspeaker 116, the outlet 132 being for emitting sound from the loudspeaker 116. The housing 128 has also has a surface area 134 which is part of the front surface 138 of the housing 128, the surface area 134 having a plurality of slits 118, and the surface area 134 being over an outlet 136 of the microphone 114, the outlet 136 being for receiving sound into the microphone 114. A Light Emitting Diode (L.E.D.) display 150 is provided to indicate when the speakerphone device 102 is powered on.

FIG. 1 also shows, in phantom, a wire cable 108 attached to the speakerphone device 102 for communicatively connecting the speakerphone device to a cellular telephone 120, also shown in phantom and not shown in actual size proportion to the speakerphone device 102. The wire cable 108 has a 2.5 millimeter plug 110 for insertion into a 2.5 millimeter jack 154 of the cellular telephone 120, given that most cellular telephones at present have 2.5 millimeter jacks.

Although, in the embodiment shown, the speakerphone device 102 is physically connected directly to a cellular telephone 120 via wire cable 108, other embodiments are possible in which the speakerphone device 102 is communicatively connected to a cellular telephone 120 in different ways, such as by being connected to a radio frequency device or other device or devices which communicatively connect the speakerphone device 102 to the cellular telephone 120. In addition, the invention contemplates wireless connection and communication between the speakerphone device 102 and the cellular telephone 120 and/or devices which are communicatively connected to the cellular telephone 120, and wireless connection and communication between devices communicatively connected to the cellular telephone 120, the wireless communication being by Wireless Application Protocol or other wireless communication protocol(s).

Figure 2:
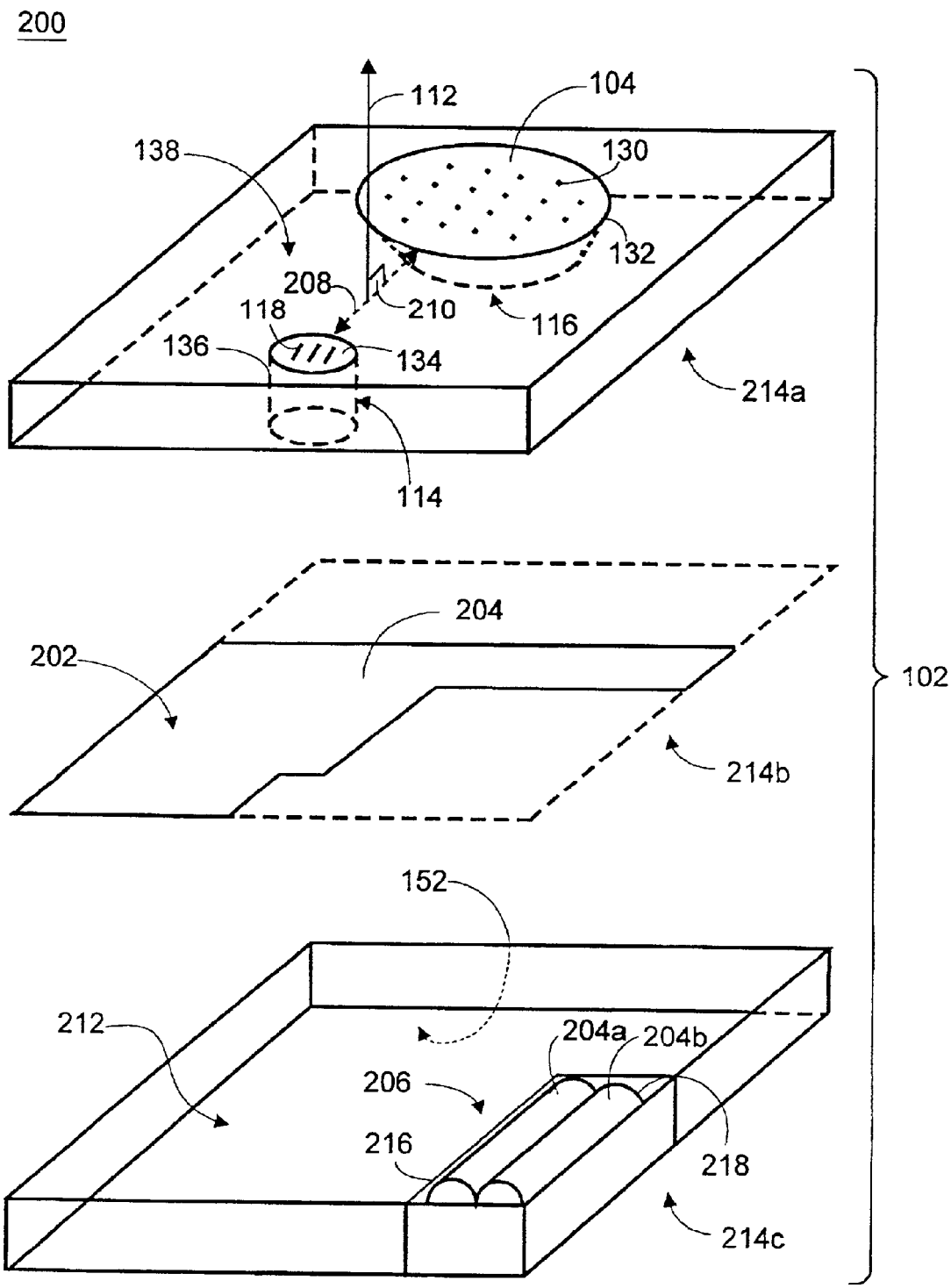
FIG. 2 is an exploded view of the hands-free adapter device depicted in FIG. 1.

The housing 128 also contains an integrated circuit 202 (shown in FIGS. 2, 4, and 5) connected to the loudspeaker 116, and supporting wiring (not shown), as well as a compartment for housing batteries 204a, 204b (shown in FIG. 2). Directional arrow 112 points in a direction which is normal to the front surface 138 of the housing 128.

FIG. 2 shows an exploded view 200 of the speakerphone device 102 depicted in FIG. 1, and view 200 is divided into view sections 214a, 214b, and 214c. As shown in view section 214a, a line 208 extending between the outlet 132 of the loudspeaker 116 and the outlet 136 the microphone 114 forms a right angle 210 with line 112, extending normal to front surface 138 of the housing 128 (shown and labeled in FIG. 1), which has been found to be a desirable configuration for reducing or minimizing internal howling. In other embodiments in which the housing is not box-shaped and the surface 138 is not planar, the loudspeaker 116 and microphone 114 may be positioned in portions of the surface which are not co-planar, and thus they may face directions which are substantially but not exactly perpendicular to the line 208 between them. For example, the microphone may be angled a few degrees away from the normal line 112 and still achieve a substantial reduction in howling. However, as the microphone is angled more and more away from the normal line 112, in any direction, and toward the line 208, the back of the microphone picks up more and more sounds vibrations within the housing from the back of the loudspeaker, thus increasing the howling and reducing sound quality to unacceptable levels. For instance, it has been observed that positioning the microphone so that it faces co-planarly with the line 208 results in a sound reflection pick up of 14 millivolts, whereas facing the microphone 114 such that it faces perpendicularly to the line 208, as depicted, for example, in the embodiment shown in FIG. 2, or in other configurations in which the microphone faces perpendicularly to the line 208, results in a sound reflection pick up level of only 3 millivolts.

Figure 4:
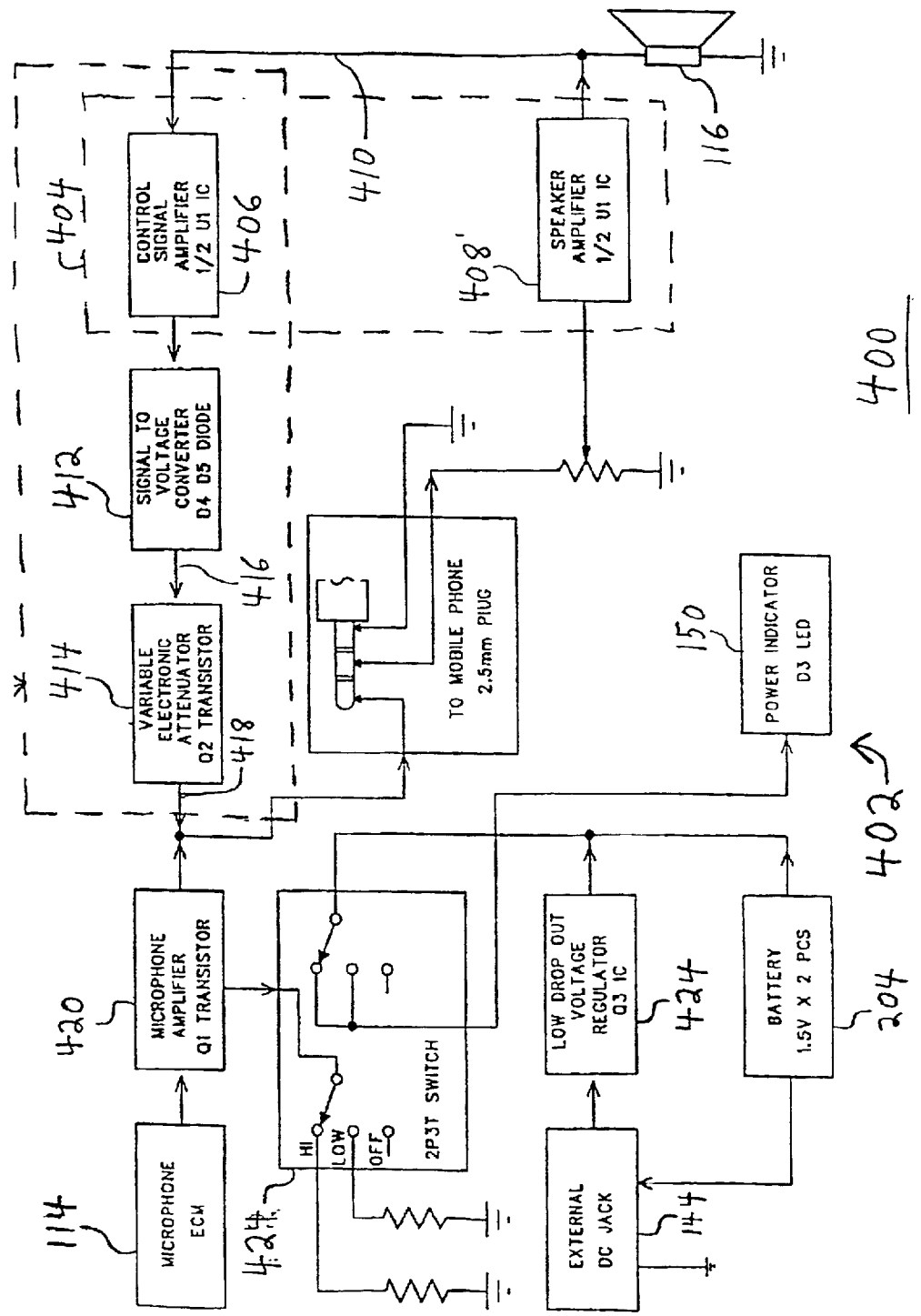
FIG. 4 is a schematic diagram of an integrated circuit of the hands-free adapter device depicted in FIG. 1.
Figure 5:
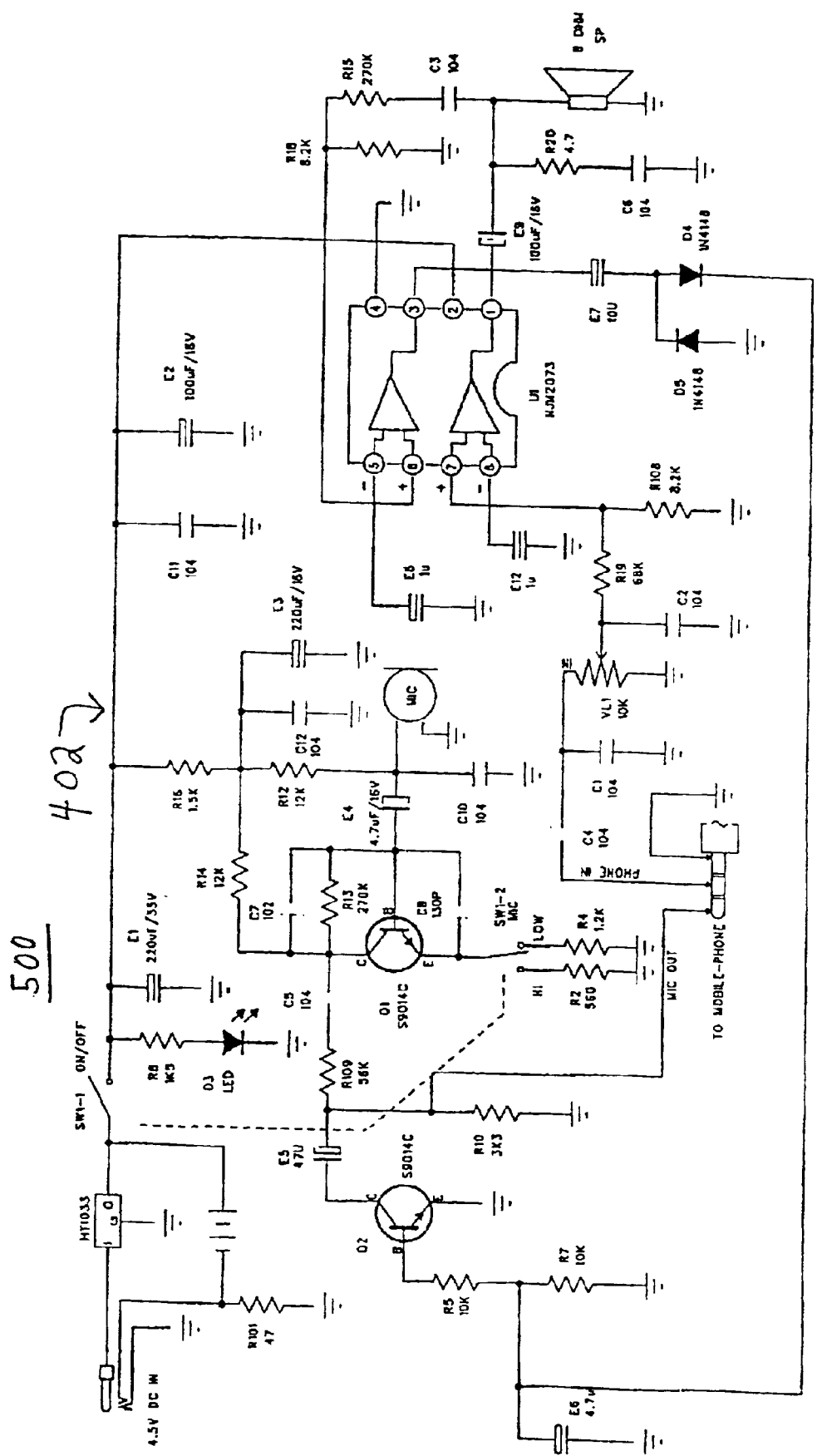
FIG. 5 is a detailed circuit diagram of the integrated circuit depicted in FIG. 4.

View section 214b shows an integrated circuit board 202 that is contained within the housing 128 and connected to the loudspeaker 116 and the microphone 114 via wiring or other means. In the embodiment of the speakerphone device 102 shown in exploded view in FIG. 2, the integrated circuit board 202 is disposed on interior surface 212 (shown in view section 214c) of the housing 128. Various electronic components (not shown) are imprinted upon and/or disposed within or upon surface 204 of the integrated circuit board 202, and FIGS. 4 and 5 provide schematic and detailed diagrams, respectively, of integrated circuit 402 (shown in FIGS. 4 and 5) of the integrated circuit board 202.

View section 214c shows a bottom portion of the speakerphone device 102. In the embodiment shown, a power supply source such as batteries 204a, 204b are contained with the housing 128, and interior walls 216, 218 are also contained within the housing 128 so that the batteries 204a, 204b are enclosed by the housing and adjacent to interior walls 216, 218. In the embodiment shown, the batteries are of the standard AAA size and type, but other types and sizes of batteries are contemplated by the invention. The batteries 204a, 204b are used to power the various components of the speakerphone device.

Figure 3:
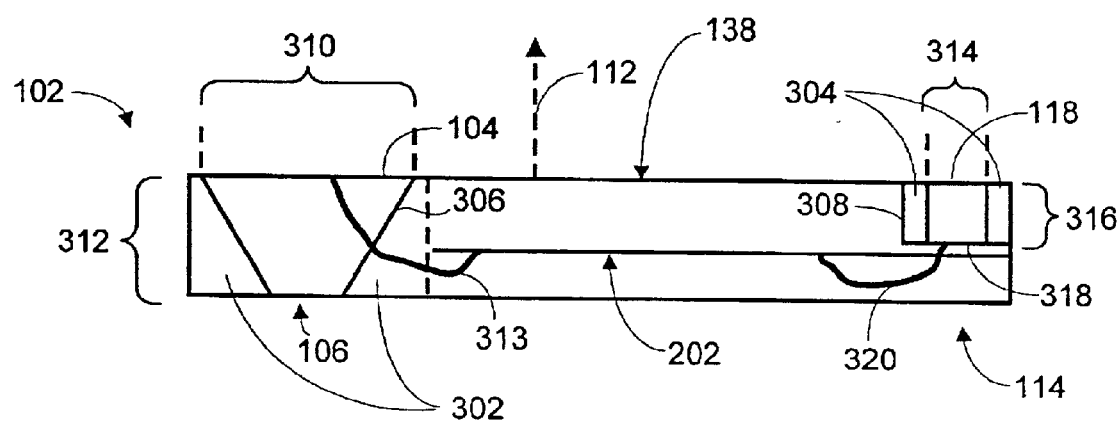
FIG. 3 is a side view of the hands-free adapter device depicted in FIG. 1.
Figure 3A:
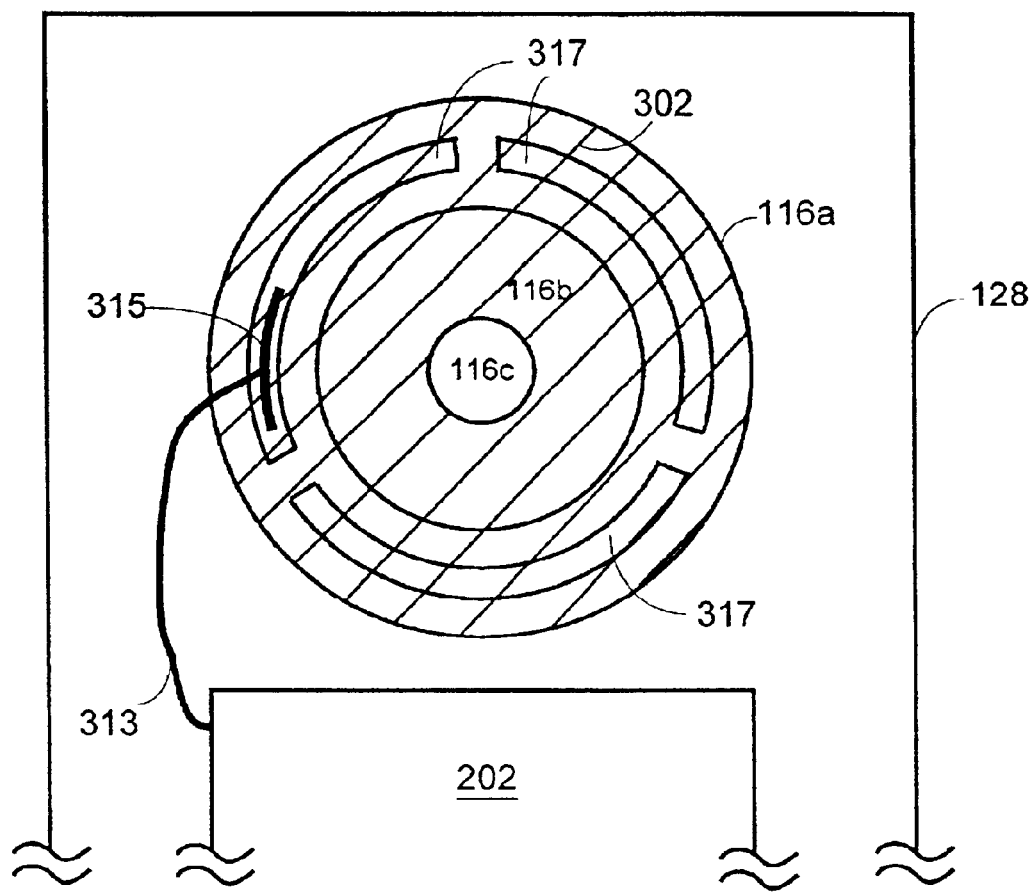
FIG. 3A is an elevated view of a portion of the hands-free adapter of FIGS. 1–3, exposed to show the loudspeaker insulation material in accordance with one embodiment of the present invention.

FIG. 3 shows a cross-sectional side view 300 of one embodiment of the speakerphone device 102 depicted in FIG. 1. In the embodiment shown, the loudspeaker 116 is roughly frustoconical in shape, with a 50 millimeter greatest diameter 310 and a 13 millimeter thickness 312 (not necessarily shown to scale in the drawing), although the invention also contemplates loudspeakers of different shapes and sizes, including, as shown in FIG. 3A, a speaker with several disc-shaped tiers having different and narrowing diameters. One or more wires 313 connect the loudspeaker 116 at the back thereof 303 with the printed circuit board 202. The microphone 114 is similarly connected to the printed circuit board 202 at the back 318 of the microphone 114 through one or more wires 320.

In the embodiment shown in FIG. 3, the sides 306 of the loudspeaker 116 are surrounded by sound insulating material 302 such as commercially available synthetic sponge or foam. It is believed that the sound insulating material 302 reduces howling at least in part by causing sound delay and/or phase shifting of sound waves travelling within the housing 128 between the loudspeaker 116 and the microphone 114, causing less sound from the loudspeaker 116 to be picked up or sensed by the microphone 114 through the back 318 or other portion of the microphone 114. The sounds waves otherwise travel virtually unimpeded through the housing 128 since the housing is small, is not partitioned, and contains only a single compartment. For instance, in testing of the speakerphone devices, it has been observed that, under similar test conditions, use of the speakerphone device 102 with the sponge around the loudspeaker 116 removed has resulted in a pick up by the microphone 114 of sound from the loudspeaker 116 of 59 millivolts, whereas use of the speakerphone device 102 with the sponge around the loudspeaker 116 in place has resulted in a pick up by the microphone 114 of sound from the loudspeaker 116 of only 52 millivolts.

As shown in FIG. 3A, which is an elevated schematic view of the back side of the loudspeaker portion of the housing 128, the loudspeaker contains three tiers, namely outer ring 116a, having a diameter approximately the same as the speaker membrane and housing outlet 104, second ring 116b, and back 116c. The outer ring 116a has gaps 317 which expose the speaker membrane. The wire(s) 313 coupled to the printed circuit board 202 are connected to vibration components 315 for activating the speaker membrane through one or more of the gaps 317. The sponge material 302 covers the outer and second rings 116a, 116b, thus insulating the internal housing components from sound transmitted through the gaps 317 and loudspeaker generally.

Returning to FIG. 3, the microphone 114 as shown has a 6 millimeter diameter 314 and a 5 millimeter thickness 316, although the invention also contemplates microphones of different shapes and sizes.

In the embodiment shown in FIG. 3, interior wall 308 is contained within the housing 128 (shown in FIG. 1), near to the microphone 114. In the embodiment shown, gap 304 between and defined by interior wall 308 and the microphone 114 is filled with glue, such as heat resistant glue, to reduce howling while securely positioning the microphone 114. The glue also substantially covers the back 318 of the microphone and surrounds the connections to the wire(s) 320. The invention also contemplates materials other than glue to fill the gap 304.

FIGS. 4 and 5 together illustrate one embodiment of an integrated circuit 402 of the integrated circuit board 202 of the speakerphone device 102 depicted in FIG. 1. FIG. 4 depicts a schematic diagram 400 of the integrated circuit 402, and FIG. 5 depicts a detailed diagram 500 the integrated circuit 402. In the embodiment shown, the integrated circuit 402 is a low voltage (NJM2073) flat package type integrated circuit, powered by two standard size AAA batteries 204a, 204b (shown in FIG. 2), each battery providing 1.5 volts, for a total of 3 volts. As shown schematically in FIG. 4, the integrated circuit 202 comprises amplifier 420, which utilizes transistor Q1 (9014) and two channel amplifier 404 comprising amplifiers 406 and 408. Amplifier 408 variably powers the loudspeaker 116, the power being variable by the user utilizing the rotary volume control 146 (shown in FIG. 1). A low drop out voltage regulator 424 utilizing transistor Q3 (HT1033) is included for use with the external power source (in case an external power source is being utilized).

The integrated circuit 202 comprises attenuation circuitry 422, sometimes referred to as variable attenuator circuitry, which, among other general functions within the overall integrated circuit 202 not related to signal attenuation, reduces howling by varying the amplification level of the signal provided to the microphone 114 inversely with the power output of the loudspeaker 116. The attenuation circuitry comprises amplifier 404, signal converter 412, and variable electronic attenuator 414. As shown by arrow 410, a portion of the electronic signal of the loudspeaker 116 passes through amplifier 406, is converted to DC by signal converter 412, which utilizes diodes D4 (IN4148) and D5 (IN4148), and then the signal passes through variable electronic attenuator 414. The variable electronic attenuator 414 utilizes transistor Q2 (9014) to vary the power of, output signal 418 inversely with the power of the input signal 416 which correlates with the power of the loudspeaker signal. The output signal 418, in turn, affects the power of the signal from the microphone 114 travelling to the cellular telephone (shown in FIG. 1), which signal is also affected by the setting of switch 424, which setting is controlled by the high/low sensitivity control 148 (shown in FIG. 1).

Hence, the attenuator circuitry 422 functions to vary the amplification level of the signal provided to the microphone 114 inversely with the power output of the loudspeaker, i.e., the power of the signal from the microphone 114 provided to the cellular telephone 120 is lowered when as power output from the loudspeaker 116 increases, and vice versa. The high/low sensitivity control 148 provides a manual adjustment means superimposed upon, i.e. additive in effect with, the automatic variable adjustment provided by the attenuation circuitry 422.

In effect, the attenuation circuitry functions as an automatic microphone sensitivity level control. Howling can occur due to sounds emitted from the loudspeaker 116 getting picked up, or sensed, by the microphone 114. This causes difficulty, for example, in setting the sensitivity level of the microphone 114 high enough to pick up the voice of the user of the speakerphone device 102, while yet setting the sensitivity level of the microphone low enough to avoid picking up the sound emitted from the loudspeaker 116 enough so as to contribute sufficiently to howling reduction. The attenuation circuitry 422 helps mitigate this problem by lowering the sensitivity level of the microphone 114 when the power output of the loudspeaker 116 is high, which is when howling from this cause is most likely or most severe, and raising the sensitivity level of the microphone 114 when the power output of the loudspeaker 116 is small, which is when howling from this cause is most likely to be less, so that additional microphone sensitivity can be afforded.

FIG. 5 depicts a detailed diagram 500 the integrated circuit 402 depicted in FIG. 4. The electronic components and layout of the integrated circuit 402 as depicted in FIG. 5 are self explanatory in light of FIG. 5 and the corresponding description thereof, above.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A portable hands-free adapter device for use with a cellular telephone, the device comprising:
   a loudspeaker electrically coupleable to the output of a cellular telephone;
   a microphone electrically coupleable to the input of a cellular telephone;
   a housing containing the loudspeaker and microphone, the housing being approximately pocket-sized; and
   means for reducing internal howling within the housing sufficiently to enable use of the device as a telephone speakerphone.

2. The device of claim 1, wherein the loudspeaker has sufficient output capacity so that a user positioned within a few feet of the device can hear words spoken to the user by the person and broadcast via the loudspeaker.

3. The device of claim 2, wherein the output capacity of the loudspeaker is about 60 decibels.

4. The device of claim 1, wherein the microphone has sufficient sensitivity to pick up speech of a user positioned within a few feet of the device when the user is speaking in a normal conversational volume.

5. The device of claim 4, the microphone has sufficient sensitivity to pick up speech at about 30 decibels.

6. The device of claim 1, wherein a volume of the housing is less than 6 cubic inches.

7. The device of claim 6, wherein the device is no more than about 3.5 inches in length, no more than about 2.2 inches in width, and no more than about 0.7 inches in thickness.

8. The device of claim 6, wherein a distance between the microphone and the loudspeaker in the housing is less than 100 millimeters.

9. The device of claim 8, wherein a distance between the microphone and the loudspeaker in the housing is less than 80 millimeters.

10. The device of claim 9, wherein the means for reducing internal howling comprises sound insulating material disposed within the housing between the loudspeaker and the microphone.

11. The device of claim 10, wherein the material is sponge which changes the phase of sound waves passing though the sponge.

12. The device of claim 10, wherein the sponge surrounds a back of the loudspeaker.

13. The device of claim 1, comprising attenuation circuitry for reducing howling by varying an amplification level of the signal provided to the microphone inversely with a power output of the loudspeaker.

14. The device of claim 1, wherein the microphone has an outlet for receiving sound, and wherein the loudspeaker has an outlet for emitting sound, and wherein the outlet of the microphone faces in substantially the same direction as a direction that the loudspeaker outlet faces.

15. The device of claim 14, wherein a line extending in the direction that the outlet of the loudspeaker faces is perpendicular to a line extending between the outlets of the loudspeaker and microphone.

16. The device of claim 1, comprising at least one conductive path between the microphone and loudspeaker.

17. The device of claim 1, comprising circuitry for receiving power from standard size batteries.

18. The device of claim 17, wherein the batteries are no larger than size AAA.

19. A portable hands-free adapter for use with a cellular telephone, the device comprising:
   a loudspeaker electrically coupleable to the output of a cellular telephone;
   a microphone electrically coupleable to the input of a cellular telephone;
   a housing containing the loudspeaker and microphone, the housing being approximately pocket-sized;
   attenuation circuitry coupled to the loudspeaker and microphone; and
   sound insulation positioned between the loudspeaker and microphone,
   wherein the attenuation circuitry and sound insulation reduce howling sufficiently to enable use of the device as a speakerphone.

20. A portable speakerphone device adaptable for use with a cellular telephone, the device comprising:
- a loudspeaker electrically coupleable to the output of a cellular telephone and having a loudspeaker outlet;
- a microphone electrically coupleable to the input of a cellular telephone and having a microphone outlet facing in a first direction;
- a housing containing the loudspeaker and microphone, the housing being approximately pocket-sized and forming a plane; and
- means for insulating sound positioned within the housing between the loudspeaker and microphone;
- wherein the outlet of the loudspeaker faces in a first direction substantially normal to the plane of the housing and the outlet of the microphone faces in a second direction substantially normal to the plane of the housing.

21. The device of claim 20, wherein the first and second directions are substantially the same.

22. A portable speakerphone device adaptable for use with a cellular telephone, the device comprising:
- a loudspeaker electrically coupleable to the output of a cellular telephone;
- a microphone electrically coupleable to the input of a cellular telephone;
- a housing containing the loudspeaker and microphone, the housing being approximately pocket-sized; and
- means for insulating sound positioned within the housing between the loudspeaker and microphone.

23. A portable speakerphone device adaptable for use with a cellular telephone, the device comprising:
- a loudspeaker electrically coupleable to the output of a cellular telephone and having a loudspeaker outlet;
- a microphone electrically coupleable to the input of a cellular telephone and having a microphone outlet facing in a first direction; and
- a housing containing the loudspeaker and microphone, the housing being approximately pocket-sized and forming a plane;
- wherein the outlet of the loudspeaker faces in a first direction substantially normal to the plane of the housing and the outlet of the microphone faces in a second direction substantially normal to the plane of the housing.

24. A method for making a portable speakerphone device adaptable for use with a cellular telephone, the method comprising:
- providing pocket sized housing means defining an exterior of the device;
- disposing loudspeaker means within the housing means;
- disposing microphone means within the housing means;
- providing means for reducing howling sufficiently to enable use of the device as a telephone speakerphone.

25. The method of claim 24, comprising providing a housing defining a volume of space less than 6 cubic inches.

26. The method of claim 25, comprising providing a housing no more than about 3.5 inches in length, no more than about 2.2 inches in width, and no more than about 0.7 inches in thickness.

27. The method of claim 26, comprising positioning the microphone and the loudspeaker less than 100 millimeters apart.

28. The method of claim 27, comprising positioning the microphone and the loudspeaker less than 80 millimeters apart.

29. The method of claim 24, wherein providing means for reducing howling comprises disposing sound insulating material between the loudspeaker and the microphone.

30. The method of claim 29, wherein the material is sponge.

31. The method of claim 29, wherein disposing sound insulating material comprises surrounding a back of the loudspeaker with sponge.

32. The method of claim 24, comprising providing attenuation circuitry for varying an amplification level of a signal provided to the microphone inversely with a power output of the loudspeaker.

33. The method of claim 24, comprising positioning the loudspeaker and microphone such that an outlet of the loudspeaker faces in a first direction substantially normal to a plane formed by the housing and an outlet of the microphone faces in a second direction substantially normal to the plane formed by the housing.

34. the method of claim 33, wherein positioning the loudspeaker and microphone comprises positioning the loudspeaker and microphone such that the first and second directions are substantially the same.

35. A method for making a portable speakerphone device adaptable for use with a cellular telephone, the method comprising:
- providing pocket sized housing means defining an exterior of the device;
- disposing loudspeaker means within the housing means;
- disposing microphone means within the housing means;
- providing attenuation circuitry means; and
- providing sound insulation means positioned between the loudspeaker means and the microphone means, wherein the attenuation circuitry means and the insulation means reduce howling sufficiently to enable use of the device as a telephone speakerphone, and wherein the outlet of the loudspeaker faces in the same direction as the outlet of the microphone, and wherein a line extending between the outlet of the loudspeaker and the outlet of the microphone would form a right angle with a line extending in the direction that the outlet of the loudspeaker and the outlet of the microphone face.

* * * * *